No. 873,236. PATENTED DEC. 10, 1907.
P. F. HILL & J. E. COLEMAN.
FERTILIZER DISTRIBUTER.
APPLICATION FILED SEPT. 19, 1907.
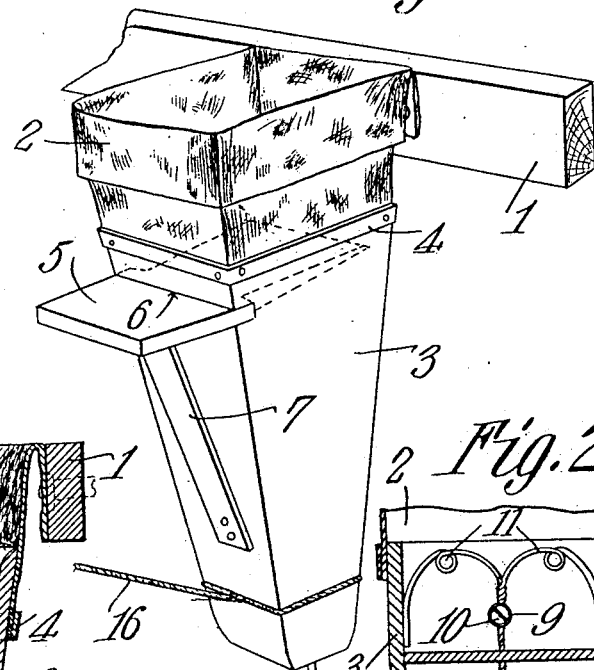
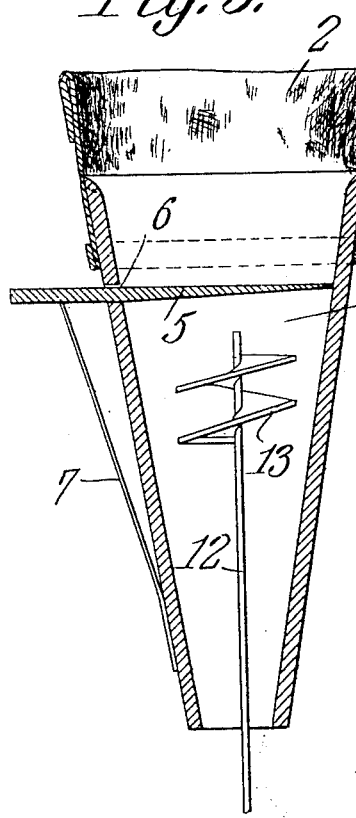
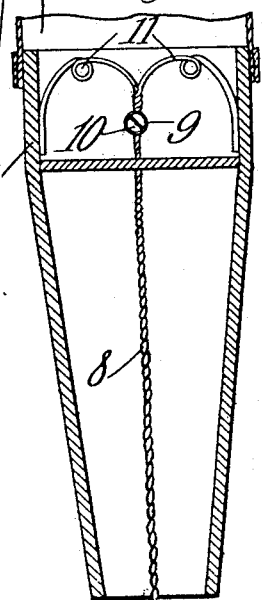
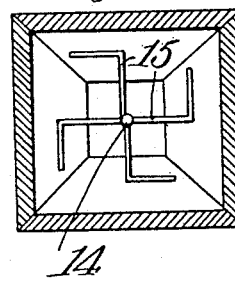
Patrick F. Hill and
John E. Coleman
Inventors

UNITED STATES PATENT OFFICE.

PATRICK FREEMAN HILL AND JOHN EDWARD COLEMAN, OF CABOT, ARKANSAS.

FERTILIZER-DISTRIBUTER.

No. 873,236.   Specification of Letters Patent.   Patented Dec. 10, 1907.

Application filed September 19, 1907. Serial No. 393,712.

*To all whom it may concern:*

Be it known that we, PATRICK FREEMAN HILL and JOHN EDWARD COLEMAN, citizens of the United States, residing at Cabot, in the county of Lonoke and State of Arkansas, have invented a new and useful Fertilizer-Distributer, of which the following is a specification.

This invention relates to fertilizer distributers.

The object of the invention is to provide an article of this character which may be readily attached to an ordinary cultivator frame, and which shall be thoroughly effective in distributing fertilizer at any stage of the crop. Furthermore, to adapt the attachment, without the employment of any positive mechanism therefor, to be actuated either to increase, diminish or wholly stop the escape of fertilizer.

With the above and other objects in view, as will appear as the nature of the invention is better understood, the same consists in the novel construction and combination of parts of a fertilizer distributer, as will be hereinafter fully described and claimed.

In the accompanying drawings forming a part of this specification and in which like characters of reference indicate corresponding parts, Figure 1 is a view in perspective displaying the distributer in operative position. Fig. 2 is a vertical transverse section through the distributer. Fig. 3 is a similar view of a slightly modified form of the invention. Fig. 4 is a transverse sectional view exhibiting a modified form of agitator.

Referring to the drawings, 1 designates a beam which may be secured to any appropriate portion of the cultivator frame. Attached to this beam is the upper end of a sack 2 of any preferred material, the lower end of which is secured to a hopper 3, as by a band 4. This hopper may be made of any suitable material and is approximately rectangular in cross section throughout its entire extent. As will be noted by reference to Fig. 1, but one edge of the sack is secured to the beam 1, and this will permit the hopper to swing to and fro.
Arranged within the hopper is a cutoff 5 which, as shown in Fig. 3, is approximately wedge-shaped in cross section in order to permit of its being readily passed through the fertilizer contained in the hopper, the gage being projected through a slot 6 in one side of the hopper and being engaged by a locking device 7, in the nature of a strip of resilient metal which is secured at its lower end to one of the walls of the hopper and bears at its upper end against the under side of the gage. As the natural tendency of the locking device is to swing towards the wall of the hopper to which it is attached, it will be obvious that its upper end will always be held in frictional engagement with the gage and thereby hold it at any desired adjustment according to the amount of the fertilizer that is to be distributed.

As a means for agitating the contents of the hopper thus to prevent clogging and to insure even distribution, there is an agitating device employed which, as shown in Fig. 2, consists of two wires twisted together to form a shank 8 that projects a sufficient distance below the lower end of the hopper to trail over the ground, and by reason of the inequalities with which it will contact it will be caused to spring, and thereby loosen any clogged fertilizer. The upper ends of the wires are formed into an eye 9 through which is passed a screw 10 for securing the agitator in position, and these ends are then bent laterally to form two spring members 11 that bear against the inner face of two of the walls of the hopper and thereby operate normally to retain the shank of the agitator in a position best to be operated upon by the surface over which it passes.

Instead of the agitator shown in Fig. 2, that shown in Fig. 3 may be employed which consists of a shank 12 having combined therewith a plurality of spirally-arranged flanges 13 forming in effect an auger. It will be seen that as the lower end of the shank 12 contacts with the ground the agitator as a whole will be moved upward, and by reason of the spiral disposition of the flanges 13 the agitator will be caused to be turned and thereby loosen up the contained fertilizer.

A further modified form of agitator is shown in Fig. 4 wherein the shank 14 carries approximately L-shaped arms 15 forming, when viewed in plan, a fylfot. In this form of agitator there is a vertical movement only, as the arms will prevent the agitator from turning within the hopper.

As a means for cutting off the feed of the fertilizer when desired, a cord or chain 16 is provided which is secured around the lower end of the hopper and passes back to the hand of the operator. It will be seen by this arrangement that upon the cord being drawn upon, the hopper will be swung, and may be brought to a horizontal plane, whereupon the descent of the fertilizer will cease.

In the use of the attachment, the sack 2 is filled with fertilizer and the gage 5 is adjusted to permit the requisite discharge of fertilizer to the hopper. Upon the machine being drawn over the ground, the lower projecting end of the agitator will contact with the soil and will be moved in such manner as to cause the fertilizer to loosen but at the same time to prevent any tendency on its part to choke or mass within the hopper.

The improvements herein defined are simple in character and will be found thoroughly efficient for the purpose designed.

What is claimed is:—

1. A fertilizer distributer comprising a hopper, means for suspending the same for swinging movements, from a suitable support, a cutoff intersecting the passage through the hopper, and an agitator projection below the lower end of the hopper and being designed to contact with the ground.

2. A fertilizer distributer comprising a hopper, a sack secured to the upper end thereof and adapted for attachment to a suitable support, a gage or cutoff intersecting the passage through the hopper, a locking device engaging with the gage, and an agitator having its lower end projected below the hopper.

3. A fertilizer distributer comprising a hopper, a sack secured thereto and adapted for attachment to a suitable support, a locking device coacting with the gage, an agitator disposed in the hopper and projecting below the lower end thereof, and means for swinging the hopper to effect cutting off of the discharge of fertilizer.

In testimony that we claim the foregoing as our own, we have hereto affixed our signatures in the presence of two witnesses.

PATRICK FREEMAN HILL.
JOHN EDWARD COLEMAN.

Witnesses:
JAMES B. GRAY,
A. E. WRIGHT.